United States Patent [19]

Ohkumo et al.

[11] Patent Number: 4,830,155
[45] Date of Patent: May 16, 1989

[54] CONTROL SYSTEM FOR A CLUTCH FOR A VEHICLE

[75] Inventors: Hiroya Ohkumo, Koganei; Ryuzo Sakakiyama, Tokyo, both of Japan

[73] Assignee: Fuji Jukogyo Kabushiki Kaisha, Tokyo, Japan

[21] Appl. No.: 63,243

[22] Filed: Jun. 15, 1987

[30] Foreign Application Priority Data

Jun. 18, 1986 [JP] Japan .................................. 61-141823

[51] Int. Cl.⁴ ............................................. F16D 41/28
[52] U.S. Cl. .............................. 192/0.052; 192/0.076; 192/0.092; 192/21.5; 192/103 R
[58] Field of Search ............... 192/0.032, 0.052, 0.076, 192/0.092, 0.096, 21.5, 103 R; 364/424.1

[56] References Cited

U.S. PATENT DOCUMENTS

| | | | |
|---|---|---|---|
| 4,466,521 | 8/1984 | Hattori et al. | 192/0.032 |
| 4,494,641 | 1/1985 | Sakakiyama | 192/0.076 |
| 4,576,265 | 3/1986 | Kumura et al. | 192/103 R X |
| 4,675,817 | 6/1987 | Sakakiyama et al. | 364/424.1 |
| 4,680,712 | 7/1987 | Sakakiyama et al. | 364/424.1 |

Primary Examiner—Rodney H. Bonck
Assistant Examiner—Richard M. Lorence
Attorney, Agent, or Firm—Martin A. Farber

[57] ABSTRACT

A system for controlling a drag torque of an electromagnetic clutch at releasing of an accelerator pedal of a motor vehicle. A detector is provided for detecting whether vehicle speed is lower than a predetermined low speed. At the low vehicle speed, drag current is corrected in dependency on engine speed so as to provide a constant drag torque.

13 Claims, 8 Drawing Sheets

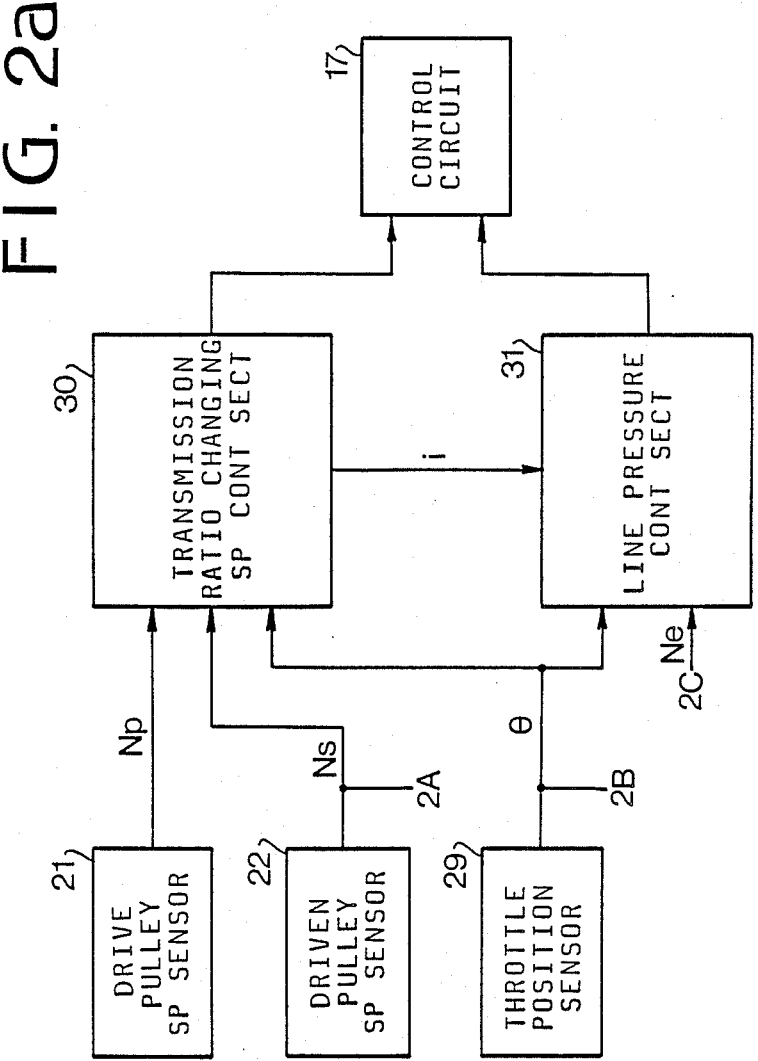

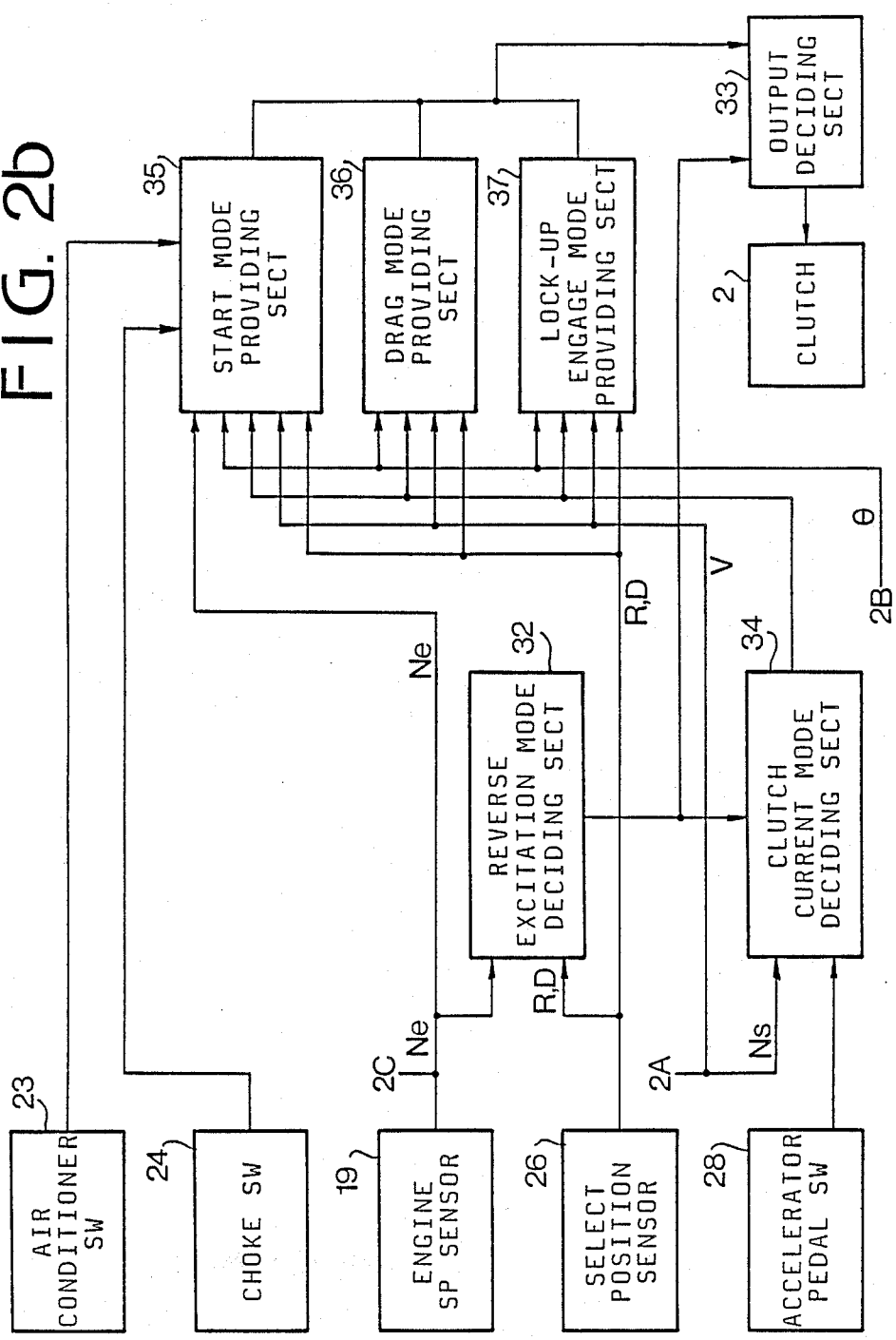

1

CONTROL SYSTEM FOR A CLUTCH FOR A VEHICLE

BACKGROUND OF THE INVENTION

The present invention relates to a control system for an electromagnetic clutch for an automatic transmission of a motor vehicle.

An automobile provided with a continuously variable belt-drive transmission with an electromagnetic clutch is disclosed in EP-A 151038. The electromagnetic clutch of the transmission is controlled by a control system to provide various operational modes such as a starting mode of a vehicle, reverse excitation mode, drag mode at release of an accelerator pedal of a vehicle, and mode of lock-up engagement. One of the modes is selected in accordance with a position of a selector lever and driving conditions to control the electromagnetic clutch.

As shown in FIG. 9, in the drag mode clutch current flowing in a coil of the electromagnetic clutch is cut off when the vehicle speed is below a predetermined speed $V_4$ to prevent stalling of the engine. When the accelerator pedal is released and the vehicle speed becomes lower than a still lower vehicle speed $V_2$, a small drag current flows in the coil, thereby applying a small drag torque to a driven member of the clutch to reduce clearances (play) in the transmission.

Although clutch current of the electromagnetic clutch is constant, the clutch torque is not determined only by the clutch current. The clutch torque is influenced by engine speed and slipping of the clutch. An experimentally established characteristic of clutch torque depending on the engine speed is shown in FIG. 7. Namely, clutch torque increases as the engine speed rises until the engine speed reaches a certain value, for example, 1500 rpm and gradually decreases thereafter. Consequently, even though the clutch control variable drag current $I_D$ is constant, drag torque $T_D$ varies depending on the engine speed as shown for example by a chain line in FIG. 9. Thus, drag torque can not be accurately controlled.

SUMMARY OF THE INVENTION

The object of the present invention is to provide a system for controlling such a clutch where drag torque is accurately controlled to be independent of engine speed.

The present invention provides means responsive to the engine speed signal for varying the clutch control variable which acts directly on the clutch for correcting the drag torque to a constant value.

The other objects and features of this invention will become understood from the following description with reference to the accompanying drawings.

BRIEF DESCRIPTION OF DRAWINGS

FIGS. 2a and 2b show a block diagram of a control unit according to the present invention;

DETAILED DESCRIPTION OF THE PREFERRED EMBODIMENT

Figure 1:
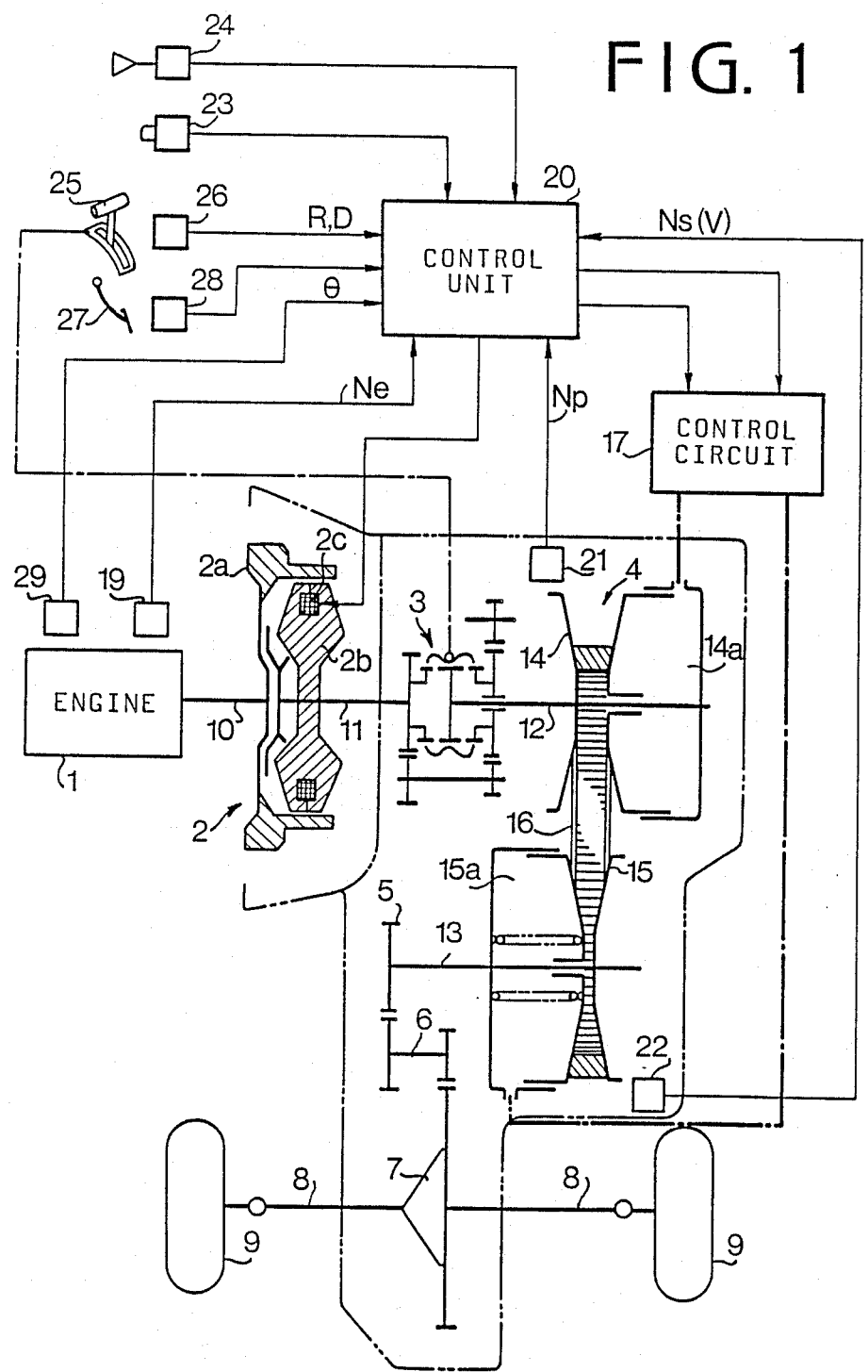
FIG. 1 is a schematic illustration of a system for controlling an electromagnetic clutch for a motor vehicle.

Referring to FIG. 1, a crankshaft 10 of an engine 1 is operatively connected to an electromagnetic powder clutch 2 for transmitting the power of the engine 1 to a continuously variable belt-drive automatic transmission 4 through a selector mechanism 3. The output of the belt-drive transmission 4 is transmitted to axles 8 of vehicle driving wheels 9 through an output shaft 13, a pair of intermediate reduction gears 5, an intermediate shaft 6, and a differential 7.

The electromagnetic powder clutch 2 comprises an annular drive member 2a connected to crankshaft 10 of the engine 1, a driven member 2b secured to an input shaft 11 of the transmission 4, and a magnetizing coil 2c provided in the driven member 2b. Magnetic powder material is provided in a gap between the drive member 2a and driven member 2b. When the magnetizing coil 2c is excited by the clutch current, the driven member 2b is magnetized to produce a magnetic flux passing through the drive member 2a. The magnetic powder is aggregated in the gap by the magnetic flux and the driven member 2b is engaged with the drive member 2a by the powder. On the other hand, when the clutch current is cut off, the drive and driven members 2a and 2b are disengaged from one another.

In the belt-drive automatic transmission 4, the selector mechanism 3 is provided between the input shaft 11 and a main shaft 12. The selector mechanism 3 is provided with a synchromesh mechanism comprising gears, hub, and a sleeve for connecting the input shaft 11 and the main shaft 12 to selectively provide a driving position (D-range) and a reverse driving position (R-range).

The continuously variable belt-drive automatic transmission 4 has the main shaft 12 and an output shaft 13 provided in parallel with the main shaft 12. A drive pulley 14 provided with a hydraulic cylinder 14a is mounted on the main shaft 12. A driven pulley 15 provided with a hydraulic cylinder 15a is mounted on the output shaft 13. A drive belt 16 engages with the drive pulley 14 and the driven pulley 15. Hydraulic cylinders 14a and 15a are communicated with an oil hydraulic control circuit 17. The hydraulic control circuit 17 is responsive to vehicle speed, engine speed and throttle valve position for controlling the amount of oil supplied to the cylinders 14a and 15a. The pulleys 14 and 15 are operated by compressive forces in the cylinders so that the running diameter of belt 16 is varied to infinitely change the transmission ratio.

An electronic control system for the clutch 2 and the belt-drive transmission 4 has an engine speed sensor 19, and rotating speed sensors 21 and 22 for respectively sensing rotating speeds of the drive pulley 14 and the driven pulley 15. A choke switch 24 produces an output signal when a choke valve of the engine 1 is closed, and an air conditioner switch 23 produces an output signal during the operation of an air conditioner. A selector lever 25 connected to the selector mechanism 3 is provided with a select position sensor 26 for sensing a drive position D and a reverse position R. An accelerator pedal switch 28 is provided for sensing the depression of an accelerator pedal 27, and a throttle position sensor 29 is provided.

Output signals of the sensors and pulses of the switches are applied to an electronic control unit 20 which produces a clutch current control signal to the clutch 2 and a control signal for controlling the transmission ratio (i) of the transmission and a line pressure control signal to the control circuit 17.

Referring to FIGS. 2a and 2b showing the control unit 20 of FIG. 1, a transmission ratio changing speed control section 30 is applied with a drive pulley speed signal $N_P$ of the sensor 21, driven pulley speed signal $N_S$ of the sensor 22, and throttle position signal $\theta$ of the sensor 29 to produce the transmission ratio control signal dependent on a desired transmission ratio changing speed (rate) di/dt. A line pressure control section 31 is applied with an engine speed signal Ne of the sensor 19, throttle position signal $\theta$ of the sensor 29, and an actual transmission ratio signal i ($N_S/N_P$) of the transmission ratio changing speed control section 30 to produce the line pressure control signal dependent on a desired line pressure. These control signals are applied to the control circuit 17 to control the transmission ratio and line pressure of the transmission 4.

A reverse excitation mode deciding section 32 is applied with the engine speed signal Ne of the sensor 19 and drive position signal of the select position sensor 26. When the engine speed Ne is below 300 rpm, or the selector lever 25 is at a neutral position (N-range) or a parking position (P-range), the reverse excitation mode deciding section 32 produces a reverse excitation signal which is applied to an output deciding section 33, so that a small reverse current flows in the clutch 2 to release the clutch completely.

A clutch current mode deciding section 34 is applied with signals from the reverse excitation mode deciding section 32 and accelerator pedal switch 28, and vehicle speed signal V from driven pulley speed sensor 22 for deciding driving conditions such as starting mode to produce output signals. The output signals are applied to a start mode providing section 35, drag mode providing section 36, and clutch lock-up engage mode providing section 37.

The start mode providing section 35 decides clutch current of a starting characteristic dependent on the engine speed Ne at an ordinary start or at closing of the choke switch 24 or air conditioner switch 23. The starting characteristic is corrected by signals from the throttle valve opening degree $\theta$, vehicle speed V, and driving positions of the D-range and R-range.

The drag mode providing section 36 decides a small drag current when the accelerator pedal 27 is released at a low speed at the D-range or R-range for providing a drag torque to the clutch 2, so as to reduce play in the power transmitting path of the transmission (e.g. between gears, pulley and belt, etc.) and to prevent a rattling or chuttering noise and unpleasant vibration, for smooth starting of the vehicle.

Figure 3:
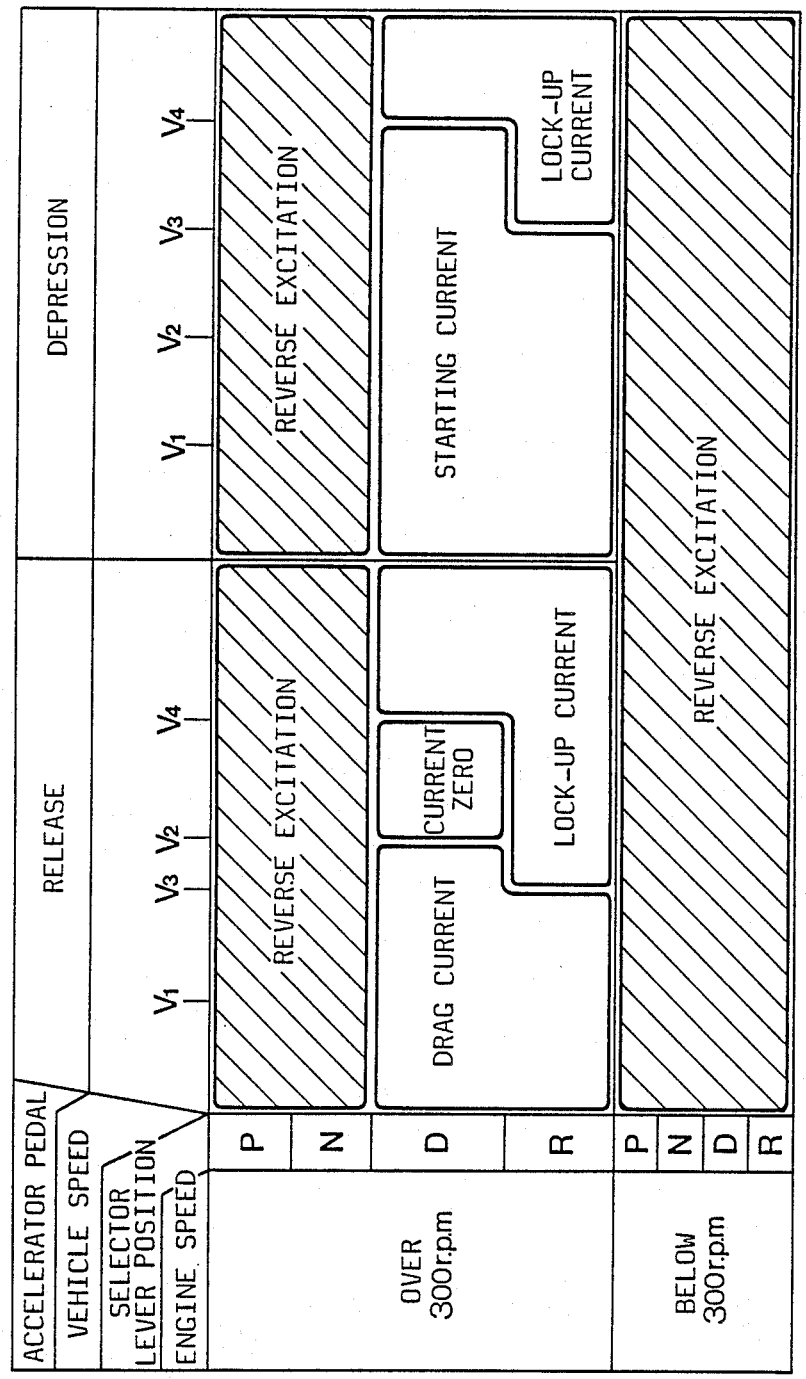
FIG. 3 is a graph showing regions of various modes.

The clutch lock-up engage mode providing section 37 decides a lock-up current in response to the vehicle speed V and throttle opening degree $\theta$ at the D-range or R-range for entirely engaging the clutch 2. Outputs of sections 35, 36 and 37 are applied to the output deciding section 33 to control the clutch current. A range of each mode is shown in FIG. 3.

Figure 4:
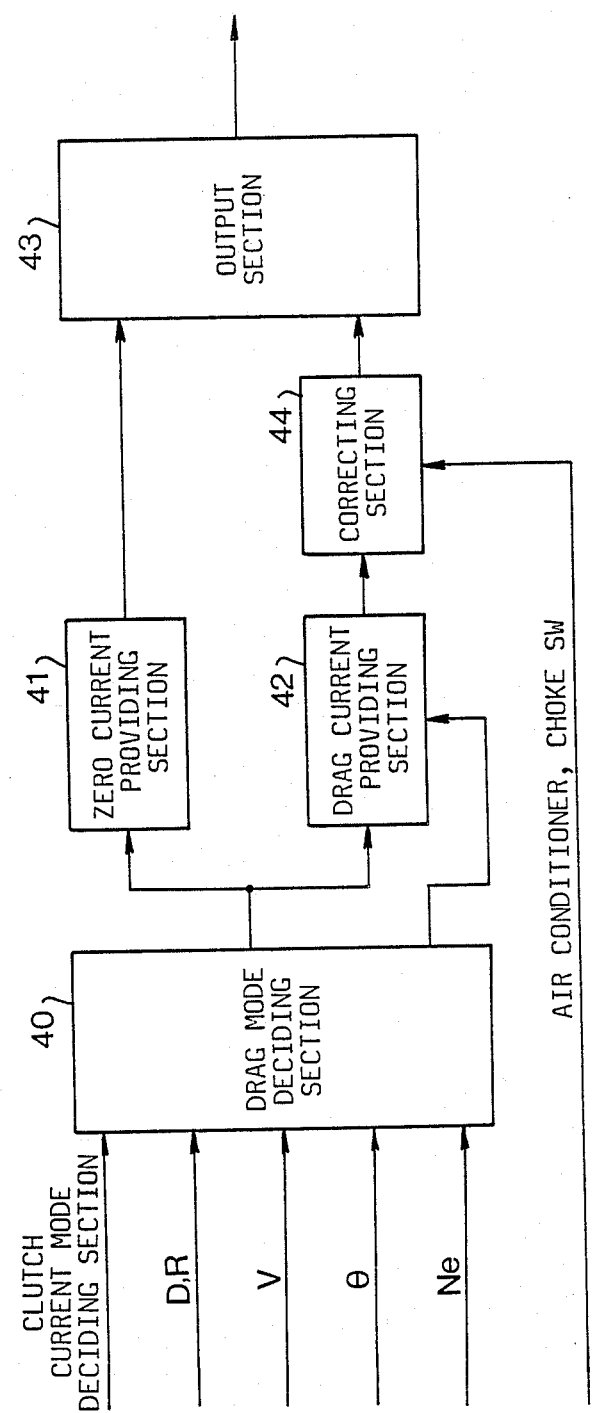
FIG. 4 is a block diagram of a main part of the system according to the present invention.
Figure 5:
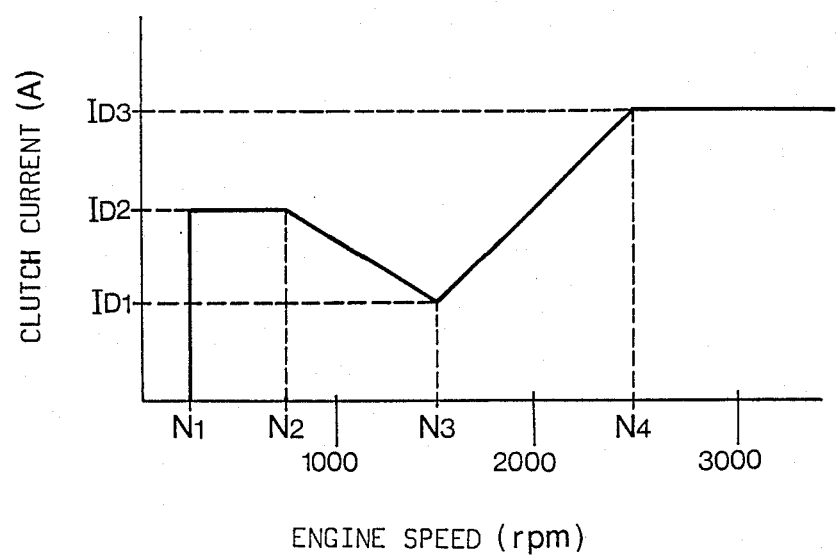
FIG. 5 is a graph showing a variation of drag current.
Figure 7:
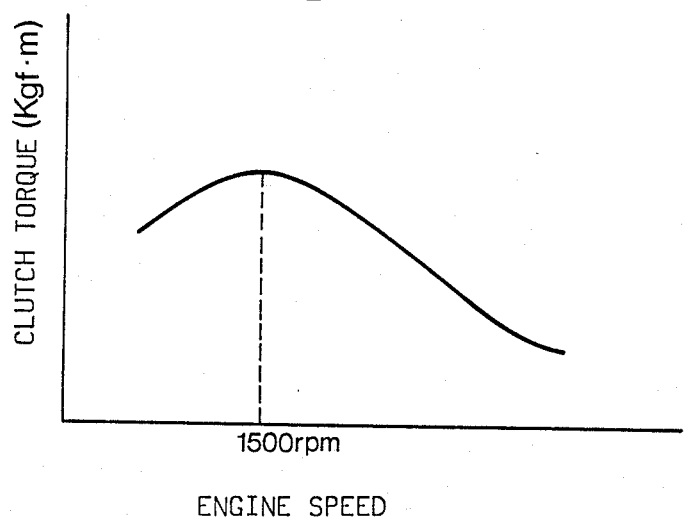
FIG. 7 is a graph showing a relationship between clutch torque and engine speed.
Figure 8:
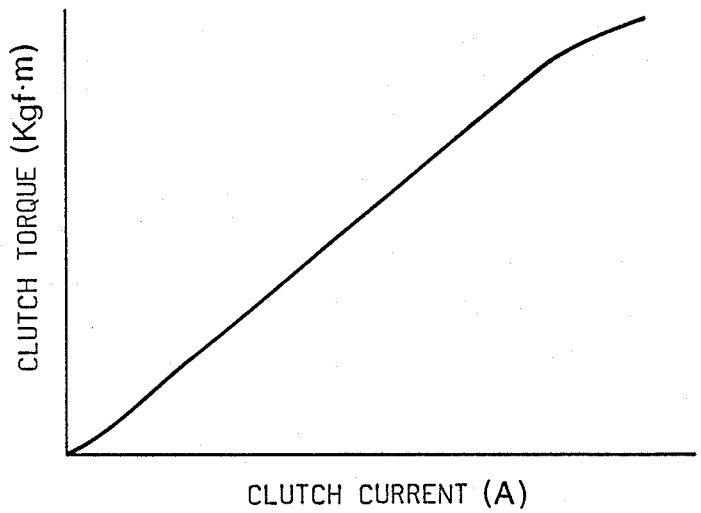
FIG. 8 is a graph showing a relationship between clutch torque and clutch current.
Figure 9:
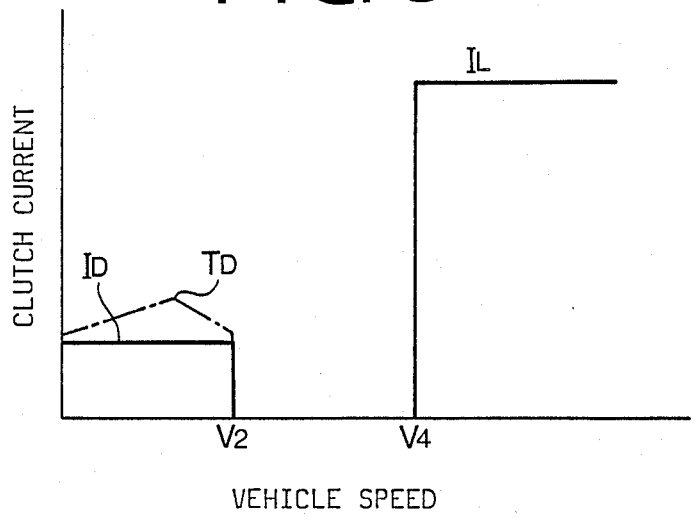
FIG. 9 is a graph showing clutch current characteristics in a prior art.

Referring to FIG. 4, the drag mode providing section 36 is provided with a drag mode deciding section 40 applied with output signals of throttle valve opening degree $\theta$, vehicle speed V, drive position R-range and D-range, engine speed Ne, and clutch current mode deciding section 34. The drag mode deciding section 40 decides that the vehicle is in a drag mode when engine speed is above 300 rpm, the accelerator pedal is released and the vehicle speed is lower than a predetermined vehicle speed $V_3$ or $V_4$ under the further conditions shown in FIG. 3, and applies a drag zero current deciding signal to a zero current providing section 41 and applies a drag current signal to a drag current providing section 42 under respective conditions illustrated. The zero current providing section 41 in response to the drag zero current deciding signal produces a signal for a zero current $I_O$ at the D-range at a vehicle speed range between $V_4$ and $V_2$. At the D-range, when the vehicle speed is lower than the predetermined speed $V_2$ and at the R-range below speed $V_3$, the drag current providing section 42 in response to the drag current signal produces a signal to provide a desired drag current $I_D$ which is applied to a correcting section 44. Either of output signals of sections 41 and 44 is applied to the output deciding section 33 through an output section 43. The drag current $I_D$ can be either derived from a map shown in FIG. 5 or calculated as a function of the engine speed. In order to correct the drag torque having the characteristic as shown in FIG. 7 to a constant drag torque, the drag current $I_D$ in the map is reduced in reverse of the drag torque between engine speeds $N_2$ and $N_3$ as shown in FIG. 5. If the drag current $I_D$ is to be calculated, engine speed $N_3$ which corresponds to the peak drag torque in FIG. 7, engine speed $N_2$ which is smaller than $N_3$, engine speed $N_4$ which is larger than $N_3$, and engine speed $N_1$ which is starting engine speed are predetermined. Drag currents $I_{D1}$, $I_{D2}$ and $I_{D3}$ for respective speeds $N_3$, $N_2$ and $N_4$ are also predetermined as follows.

When $N_e \leq N_1$, $I_D = 0$
When $N_1 < N_e \leq N_2$, $I_D = I_{D2}$
When $N_2 < N_e \leq N_3$, $I_D = I_{D2} + (I_{D1} - I_{D2}) \cdot (N_e - N_2)/(N_3 - N_2)$
When $N_3 < N_e \leq N_4$, $I_D = I_{D1} + (I_{D3} - I_{D1}) \cdot (N_e - N_3)/(N_4 - N_3)$
When $N_e > N_4$, $I_D = I_{D3}$ During operation of an air conditioner or under choking condition, while the engine idles, the engine speed is increased so that creeping of the vehicle may occur. In order to prevent such a hindrance, it is preferable to reduce the drag current $I_D$. Thus, the present invention may be further provided with correcting section 44 to which the output of the drag current providing section 42 and the outputs of the air conditioner and choke switches are applied. When the air conditioner switch 23 or the choke switch 24 is turned on, the value of the drag current $I_D$ obtained at the providing section 42 is decreased at the correcting section 44.

Figure 6:
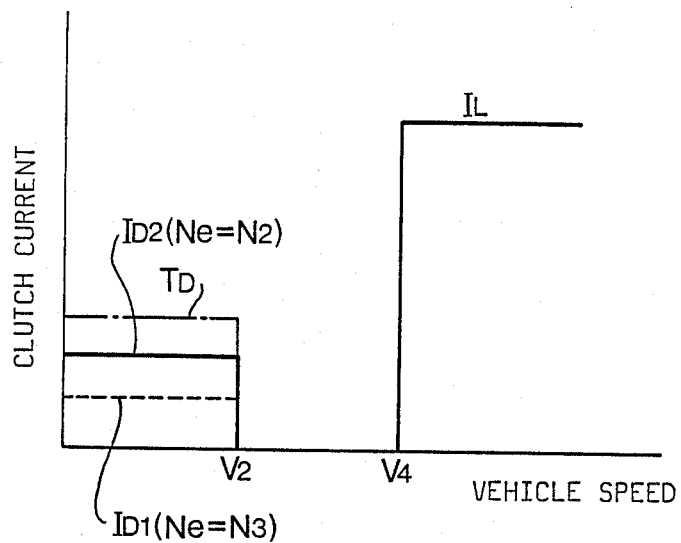
FIG. 6 is a graph showing clutch current characteristics.

The operation of the system will be described hereinafter with reference to FIG. 6 showing a characteristic of the clutch current.

When the vehicle speed becomes lower than the speed $V_4$ at the release of the accelerator pedal at D-range, the drag mode deciding section 40 decides that the vehicle is in the drag mode. The zero current providing section 41 produces a signal so that the lock-up current $I_L$ becomes a zero current $I_O$ to disengage the clutch 2. When the vehicle is further decelerated to a speed lower than $V_2$, the drag current $I_D$ which is decided at the drag current providing section 42 flows in the coil 2c.

The drag current $I_D$ is calculated depending on the engine speed $N_e$ so as to have characteristic shown in FIG. 5. For example, When $N_e = N_2$, $I_D = I_{D2}$ $N_e = N_3$, $I_D = I_{D1}$ Accordingly, the drag current $I_D$ will vary as shown in FIG. 5. Thus, drag torque $T_D$ becomes constant.

In accordance with the present invention, play in the transmission is reduced by the drag torque so that the vehicle can be smoothly reaccelerated because the drag torque is constant at any vehicle speed. Consequently, the creeping of the vehicle which occurs as a result of excessive drag torque is prevented.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A system for controlling a drag torque of a clutch of a motor vehicle wherein the drag torque is variable by a clutch control variable and engine speed, respectively, the clutch control variable acting directly on the clutch to vary clutch engagement and disengagement, the system comprising:

first detecting means for detecting releasing of an accelerator pedal of the vehicle, and for producing a release signal;

second detecting means for detecting vehicle speed and for producing a low speed signal when the vehicle speed is lower than a predetermined low speed;

third detecting means for detecting engine speed and for producing an engine speed signal dependent on the engine speed;

first means responsive to the release signal, engine speed signal and low speed signal for varying the clutch control variable responsive to the engine speed signal for correcting the drag torque to a constant value independent of engine speed.

2. The system according to claim 1 wherein the clutch is an electromagnetic clutch.

3. The system according to claim 2, wherein the clutch control variable is clutch current.

4. The system according to claim 1, wherein the clutch has a characteristic curve that its drag torque is variable by engine speed with a constant value of said clutch control variable such that a maximum drag torque occurs at a predetermined engine speed, and wherein said first means varies the clutch control variable with engine speed reversely to said characteristic curve such that said drag torque has said constant value.

5. The system according to claim 4, wherein said predetermined engine speed is substantially 1500 rpm.

6. In a control system for an electromagnetic clutch operatively connecting a transmission and an engine mounted on a motor vehicle, comprising engine speed sensing means for sensing engine speed, vehicle speed sensing means for sensing vehicle speed, accelerator pedal detecting means for detecting release of an accelerator pedal, select position sensing means for detecting a selected position of the transmission, drag mode deciding means for producing a drag mode deciding signal responsive to release of the accelerator pedal, certain values of the engine speed and vehicle speed, and certain selected positions of the transmission, and drag current providing means responsive to the drag mode deciding signal for providing drag current in the clutch, the improvement of the control system wherein;

said drag current providing means is for providing the drag current as a function of engine speed such that a constant drag torque of the clutch occurs, whereby smooth reacceleration is enabled.

7. The system according to claim 6, wherein said certain engine speed is over 300 rpm and said certain selected positions are drive and reverse range and said certain values of vehicle speeds are predetermined low speeds.

8. The system according to claim 6, wherein said drag current providing means includes a map of the drag current as a function of engine speed.

9. The system according to claim 8, wherein said map is for reading out one of a plurality of values of drag current corresponding to the engine speed.

10. The system according to claim 6, wherein said drag current providing means is further for calculating the drag current as a function of engine speed.

11. The system according to claim 6, wherein the engine has a choke valve, the control system further comprising correcting means for correcting the drag current when the choke valve is closed so as to decrease the drag current.

12. The system according claim 6, the vehicle including an auxiliary load actuated by the engine, and control system includes correcting means for correcting the drag current when the auxiliary load is actuated so as to decrease the drag current.

13. The system according to claim 12, wherein said auxiliary load is an air-conditioner.

* * * * *